March 31, 1925.  
H. G. McDOWELL  
PIPE JOINT  
Filed Aug. 21, 1922  
1,531,563
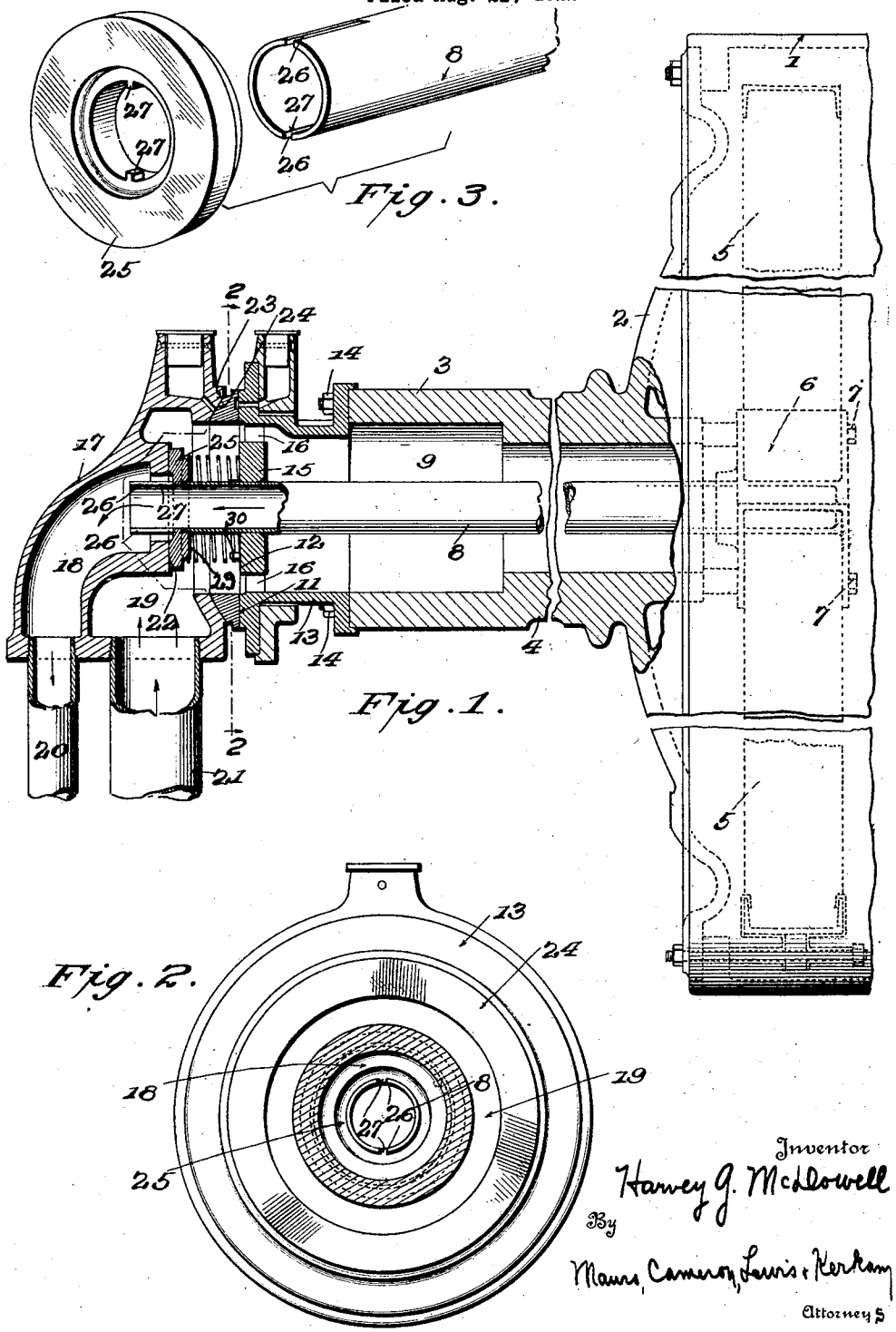

Patented Mar. 31, 1925.

1,531,563

UNITED STATES PATENT OFFICE.

HARVEY G. McDOWELL, OF WILMINGTON, DELAWARE.

PIPE JOINT.

Application filed August 21, 1922. Serial No. 583,373.

*To all whom it may concern:*

Be it known that I, HARVEY G. Mc-DOWELL, a citizen of the United States of America, and a resident of Wilmington, Delaware, have invented new and useful Improvements in Pipe Joints, which invention is fully set forth in the following specification.

This invention relates to pipe joints, and more particularly to pipe joints adapted to maintain fluid tight connection between two pairs of pipes or conduits one of which pairs is stationary and one of which pairs is rotating.

A construction embodying the invention is especially adapted for use with the rotating drums which form parts of paper drying machines, each of the drums of which machines is provided at one end with a hollow trunnion, through which steam is supplied to heat the drum and through which the water of condensation is removed from the drum.

It has heretofore been proposed to provide joint means between the rotating and non-rotating conduits of paper drying drums, but such joint means have been found defective for the reason that, the steam escapes from the steam conduit into the water conduit thereby setting up a pressure in the latter which tends, and in some cases does, prevent discharge of the water from the drum.

The principal object of my invention is to overcome the disadvantages of prior devices by providing an improved and simple construction which maintains a fluid tight joint between the steam inlet and water outlet conduits of the rotating and non-rotating parts; which is inexpensive to manufacture and capable of installation with all commercial types of devices having opposed concentric rotating and non-rotating fluid conduits; which provides for relative transverse movement of the parts without disturbing the fluid tight connections therebetween; and which utilizes the steam pressure to maintain the fluid tight connection between the outer and inner conduits.

The invention is capable of a variety of mechanical expressions, one of which is shown in the accompanying drawing, but it is to be expressly understood that the drawing is for purposes of illustration only and is not intended to limit the scope of the invention, the appended claims being relied upon for that purpose.

In the drawing:

Fig. 1 is a side elevation with parts broken away showing the pipe joint applied to one end of a paper drying drum;

Fig. 2 is a transverse sectional view on the line 2—2 of Fig. 1; and

Fig. 3 is a perspective detail of parts of the joint means, the same being separated for purposes of clearer illustration.

Referring to the drawings, 1 represents a rotatable roll, drum or the like, of a paper making or other similar machine, the drum being closed at the end by the head 2. The head 2 has connected to it and preferably formed integral therewith a hollow trunnion 3 having a bearing surface 4, by means of which the trunnion and drum are rotatably supported in a suitable bearing not shown. The hollow trunnion 3 serves as a part of a combined steam and water duct, as will be fully described.

For removing the water from the interior of the drum, a rotating device is provided which preferably comprises two dippers 5—5 of the usual construction. The outer ends of the dippers are positioned near the periphery of the drum and the inner ends are connected with a receiving chamber 6 which is secured to the head 2 by means of bolts 7—7. The chamber 6 is provided with the usual discharge aperture which communicates with the water discharge passage or conduit in the hollow trunnion. In the construction shown the aperture is so positioned as to communicate with the rotating water discharge pipe or conduit 8 which is positioned centrally in the passage or conduit 9, extending longitudinally through the trunnion 3. The said passage 9 serves to conduct steam into the drum in the usual manner. The end of the rotating journal terminates in two concentric bearing surfaces 11 and 12, preferably forming parts of a single plane surface. Preferably, these bearing surfaces are formed on a separate ring 13 secured to the end of the trunnion 3 by means of bolts 14—14. The ring 13 is formed with a central hollow hub 15 into the aperture of which the pipe or conduit 8 tightly fits. The hub 15 is connected to the main body part of the ring by means of webs 16—16 which provides passages through which fluid may be directed into conduit 9.

Opposite the end of the trunnion 3 is located a stationary non-rotating part or abutment 17, having inner and outer concentric passages or conduits 18 and 19 in endwise register respectively with the pipe 8 and the passage or conduit 9. One of the conduits, herein shown as the conduit 18, is of greater diameter than the other herein shown as the conduit 8, the latter projecting into the former in spaced relation with the wall thereof and providing for relative transverse movement of the opposed conduits. The passage 18 communicates with the water discharge pipe 20 and the passage 19 communicates with a steam inlet pipe 21. The end of the inner passage 18 adjacent to the pipe 8 terminates in a flat bearing surface 22, having a central aperture of greater diameter than the pipe 8, and the passage or conduit 19 is formed to provide part of a single spherical bearing surface 23.

Preferably, suitable joint means are interposed between the bearing surfaces 11 and 23, and between the surfaces 12 and 22 to maintain communication between the opposed conduits of the rotating and non-rotating parts and provide fluid tight connections therefor. In the preferred embodiment of the invention the joint means consists of two independent parts one of which comprises a floating ring 24 positioned between the rotating and non-rotating parts and provided with bearing surfaces shaped to fit surfaces 11 and 23, said means being rotatable, independently of the rotating and non-rotating parts. The other part of said joint means comprises a washer 25 having a central aperture through which the pipe 8 projects, said washer being adjustably connected with the pipe to rotate therewith and having a rotating bearing engagement with the flat surface 22 of the conduit 18. The adjustable connection between pipe 8 and the washer 25 is preferably provided by longitudinally extending slots 26—26 formed in the outer end of the pipe which receive inwardly projecting lugs 27—27 formed on the inner wall of the washer. Sufficient clearance is left between the washer and pipe and the lugs and slots respectively to provide a limited universal movement of the washer whereby engagement of the same with the surface 22 will be insured on relative transverse movement of the rotating and non-rotating parts. Engagement of the washer 25 with the surface 22 is automatically effected by means of a coil spring 28 which surrounds the conduit 8 and has a bearing at one end on the bearing surface 12 and at its opposite end on the washer 25. The spring 28 is of greater diameter than the conduit 8 and engages a cap portion 29 of the washer and pins 30 which project from the bearing surface 12, which engagement prevents displacement of the spring during relative movement of the parts and provides for rotation of the spring with the pipe and washer. In operation of the drum, the pressure of the steam admitted thereto through the pipe 21, conduit 19 and conduit 9, assists in maintaining engagement of the washer with the bearing surface 22, thus insuring a tight joint between the inner and outer conduits of the rotating and non-rotating parts. Suitable means (not shown) may be employed to hold the opposed ends of the rotating and non-rotating parts into fluid tight engagement with the floating ring 24, which means is preferably the usual spring pressed yoke and collar such as shown in the U. S. patent to Savery No. 635,512.

During the operation of the drum the same is supplied with steam from the pipe 21 and conduit 19, the steam passing through the apertures between the webs 16—16 into the conduit 9 which leads into the drum. The water of condensation in the drum is collected by the dippers 5 in the usual manner and ejected through conduits 8, 18 and pipe 20 to the place of water discharge.

It will be apparent that various changes in the construction and arrangement of parts may be made without departing from the scope of the invention, and such changes are contemplated within the scope of the appended claims; for example the water may be discharged through the steam inlet and the steam introduced through the water discharge passage.

What is claimed is:—

1. In combination, a hollow rotating member, a rotating pipe positioned in the opening of said rotating member, a non-rotating abutment having independent concentric passages, the outer passage registering with the opening of said hollow rotating member and the inner passage being of greater diameter than said pipe and receiving one end of the same, a floating joint ring positioned between the rotating member and said abutment, and a washer adjustably mounted on said pipe to rotate therewith and bearing against the end of the inner abutment passage adjacent to said pipe.

2. In combination, a hollow rotating member, a rotating pipe positioned in the opening of said rotating member, a non-rotating abutment having an outer passage in endwise register with the opening of said rotating member and an inner passage of greater diameter than said pipe and receiving one end of the same, a floating joint ring positioned between said rotating member and the abutment and rotatable independently of both of them, and automatically adjustable joint means carried by the pipe to rotate therewith and bearing against the end of the inner abutment passage adjacent to said pipe.

3. In combination, a hollow rotating member and a non-rotating abutment arranged for relative transverse movement, outer and inner concentric passages in each of said parts in endwise register respectively, the inner passage of said rotating member consisting of a pipe extending into the inner abutment passage in spaced relation with the wall thereof, and floating joint means between the abutment and said rotating member comprising two independent parts automatically adjustable on relative transverse movement of the rotating member and said abutment to maintain communication between the respective passages thereof, one of said parts being positioned outside the outer passages of the rotating member and abutment and the other part being mounted on said pipe to rotate therewith and bearing against the end of said inner abutment passage adjacent to the pipe.

4. In combination, a hollow rotating part, a rotating pipe positioned centrally in the opening of said rotating part, a non-rotating part provided with outer ad inner concentric passages communicating with the opening of said rotating part and said pipe respectively, and means providing for relative transverse movement of said parts comprising a bearing surface formed on one end of the inner passage of the non-rotating part having an aperture of greater diameter than said pipe and through which the latter projects, a washer adjustably mounted on said pipe and engaging said bearing surface, and a floating ring positioned between the ends of the rotating and non-rotating parts.

5. In combination, a rotating part and a non-rotating part each provided with two fluid conduits one of which surrounds the other, the outer conduits of said parts being in endwise register, the inner conduit of one part projecting into the inner conduit of the other part in spaced relation with the wall thereof, joint means carried by the inner conduit of lesser diameter engaging the adjacent end of the inner conduit of greater diameter, said engagement being maintained by fluid pressure in the outer conduits, and an independent floating ring positioned between said rotating and non-rotating parts outside the outer passages thereof.

6. In combination, a rotating part and a non-rotating part each provided with two concentric fluid conduits, the outer conduits being in endwise register and the inner conduit of one part projecting into the inner conduit of the other part in spaced relation with the wall thereof, joint means carried by the inner conduit of lesser diameter, means causing said joint means to bear against the adjacent end of the inner conduit of greater diameter, and independent joint means between the rotating and non-rotating parts positioned outside the outer passages thereof.

7. In combination, a rotating part and a non-rotating part free for relative transverse movement and each provided with two concentric fluid conduits, the outer conduits being in endwise register, the inner conduit of one part being of lesser diameter than the inner conduit of the other part and projecting within the latter, a washer adjustably mounted on one end of the inner conduit of lesser diameter and bearing against the adjacent end of the inner conduit of greater diameter, said washer maintaining a fluid tight joint between the inner and outer conduits on relative movement of the parts, and a floating joint ring between the rotating and non-rotating parts maintaining communication between the outer passages thereof.

8. In combination, a hollow rotating member, a rotating pipe positioned centrally in the opening of said member and provided at one end with longitudinally extending slots, a non-rotating abutment provided with an outer passage in endwise register with the opening in said rotating member and an inner passage of greater diameter than said pipe and receiving the slotted end thereof, and joint means maintaining communication between said parts and providing for relative transverse movement of the same, said means comprising a washer having tongues engaging in the slots of said pipe whereby the two rotate together, a spring causing said washer to engage the end of the inner abutment passage adjacent to said pipe and automatically maintaining said engagement on relative transverse movement of the parts, and a floating ring arranged between the adjacent ends of the rotating member and said abutment.

9. In combination, a hollow rotating member, a rotating pipe positioned centrally in the opening of said member, a non-rotating abutment free for transverse movement relatively to said rotating member and having concentric fluid passages therein registering with the member opening and pipe respectively, means maintaining a fluid-tight joint between the outer and inner passages of said parts, said means comprising a washer adjustably mounted on said pipe to rotate therewith and engaging the end of the inner abutment passage adjacent to said pipe, and means automatically maintaining said engagement on relative movement of the abutment and rotating parts.

10. In combination, a rotating part and a non-rotating part arranged in opposed relation and each provided with two concentric fluid conduits, the inner conduits projecting one within the other and having relatively different diameters to provide for relative transverse movement of the parts, means maintaining a fluid tight joint between the inner and outer conduits of said parts and comprising a member having a limited universal connection with the conduit of lesser diameter and engaging the adjacent end of the conduit of greater diameter, means automatically maintaining said engagement on relative movement of the parts, and floating joint means arranged between the ends of the rotating and non-rotating parts automatically maintaining communication between the outer conduits thereof.

11. A combined steam and water duct comprising oppositely disposed rotating and non-rotating pairs of concentric conduits free for relative transverse movement, the inner conduits having relatively different diameters and projecting one within the other, and means adjustably mounted on the inner conduit of lesser diameter automatically operating to engage the adjacent end of the inner conduit of greater diameter and maintain a fluid tight joint between the inner and outer conduits.

12. A combined steam and water duct comprising oppositely disposed rotating and non-rotating pairs of concentric conduits free for relative transverse movement, the inner conduits having relatively different diameters and projecting one within the other, means carried by the inner conduit of lesser diameter operating by fluid pressure to engage the adjacent end of the conduit of greater diameter and maintain a fluid tight joint between the outer and inner conduits, and floating joint means between the opposed ends of the outer conduits and provided with a passage registering with the passage of said outer conduits.

13. A combined steam and water duct comprising two rotating concentric conduits and two non-rotating concentric conduits free for relative transverse movement respectively, the outer conduits and the inner conduits being respectively in endwise register, and means mounted on one of said conduits to move along the same and engage the adjacent end of the conduit in register therewith, said means automatically operating to maintain a fluid tight joint between the inner and outer conduits.

14. A combined steam and water duct comprising two rotating concentric conduits and two non-rotating concentric conduits arranged in opposed relation, one of said conduits being of lesser diameter than the conduit opposed thereto, and means maintaining communication between said conduits and providing for relative transverse movement of the same, said means consisting of two independent floating joints one of which is positioned between the conduits of equal diameter and provided with a passage registering with the opposed passages of the same, the other floating joint means being carried by said conduit of lesser diameter and engaging the adjacent end of the opposed conduit of greater diameter to maintain a fluid-tight joint between the inner and outer conduits.

15. A combined steam and water duct comprising a rotating part and a non-rotating part, each part having two concentric conduits, a floating joint between said parts having a passage registering with the passages of the outer conduits, and means carried by one of the inner conduits engaging the end of the other inner conduit to maintain a fluid tight joint between the inner and outer conduits, said means being automatically adjustable to provi for relative transverse movement of the rotating and non-rotating parts.

16. A combined steam and water conduit comprising a rotating part and a non-rotating part, each part having two concentric conduits, a floating joint ring between said parts outside the outer conduits thereof, the bearings at one side of said ring forming part of a single spherical surface, and means carried by one of the inner conduits engaging the adjacent end of the other inner conduit to maintain a fluid tight joint between the inner and outer conduits, said means being automatically adjustable to provide for relative transverse movement of the rotating and non-rotating parts.

17. A combined steam and water duct comprising a rotating part and a non-rotating part, each part having two conduits one of which surrounds the other, the outer conduits and the inner conduits being in endwise register respectively, and fluid tight joint means maintaining communication between each two opposed conduits and providing for relative transverse movement of the same, said joint means comprising an independently rotatable floating ring positioned between the opposed ends of the outer conduits and a washer carried by one of the inner conduits automatically adjustable to engage the adjacent end of the other inner conduit.

18. A combined steam and water duct comprising a rotating part and a non-rotating part, the rotating part having concentric fluid conduits, and the non-rotating part having fluid conduits in longitudinal register with the conduits of said rotating part, means maintaining a fluid tight connection between the rotating and non-rotating parts, and independent means maintaining a fluid tight connection between the inner and outer conduits of said parts, said independent means being adjustably mounted on one of the conduits and engaging the adjacent end of the opposite conduit the engagement of said means with said conduit being effected by fluid pressure.

19. A combined steam and water duct comprising a hollow rotating journal, a pipe positioned centrally in the opening of said journal and rotatable therewith, a non-rotating abutment having two separate passages in endwise register with the opening in said journal and said pipe respectively, means maintaining a fluid tight joint between said rotating journal and said abutment, and independent means adjustably mounted on said pipe to rotate therewith and bearing against the adjacent end of the inner abutment passage, said independent means providing a fluid tight joint between the outer and inner passages of said parts, the engagement of said means with the end of said inner abutment passage being automatically effected by the fluid pressure in the outer passages.

20. In combination, a hollow rotating journal, a pipe positioned centrally in the opening of said journal and rotatable therewith, a non-rotating abutment arranged in opposed relation to said journal and free for transverse movement relatively thereto, said abutment having an outer passage communicating with the journal opening and an inner passage of greater diameter than said pipe into which the latter projects, means maintaining a fluid tight connection between the rotating journal and said abutment and providing for relative transverse movement therebetween, and independent means maintaining a fluid tight joint between the outer and inner conduits, said means comprising a washer connected with said pipe to rotate therewith and rotatably engaging the adjacent end of the inner abutment passage, the connections between said pipe and washer providing for adjustment of the same to insure said engagement, and yieldable means interposed between said rotating journal and said washer automatically maintaining engagement of the latter with the end of said inner abutment passage.

21. In combination, a hollow revolving journal, an abutment having an outer passage through which steam is admitted to said journal and an inner passage, a water pipe projecting through said journal into the inner passage of said abutment in spaced relation with the wall of said passage, an independently rotatable floating joint ring positioned between said rotating journal and said abutment, and automatically adjustable means maintaining a fluid tight joint between the steam and water passages of said parts, said means comprising a washer engaging the end of the inner abutment passage through which the pipe projects and movably mounted on said pipe to rotate therewith, the engagement of said washer with the end of said inner abutment passage being effected by the fluid pressure in said steam passage.

22. In combination, a hollow rotatable drum provided with a hollow trunnion, a dipper secured within the drum to rotate therewith, a rotating pipe within the hollow trunnion connected at one end to the dipper, a bearing surface at the outer end of said trunnion provided with a central aperture through which the outer end of said pipe projects and passages registering with the opening of said trunnion, an abutment at the outer end of said trunnion having two passages one of which registers with the passages of said bearing surface and the other of which receives the outer end of said pipe, means maintaining a tight connection between the abutment and said rotating trunnion, and independent means carried by said rotating parts to rotate therewith and providing a tight joint between the outer and inner passages of said parts, said means rotatably engaging the end of said abutment passage into which said pipe projects, and being automatically adjustable to maintain said engagement on relative rotary and transverse movement of the parts.

23. In combination, two communicating conduits, one of said conduits being rotatable with respect to the other, and automatically adjustable means maintaining a fluid tight connection between said conduits and providing for relative transverse movement thereof, said means being adapted to move along one conduit and engage one end of the other conduit.

24. In combination, a rotating part and a non-rotating part free for relative transverse movement each of said parts having two conduits one of which surrounds the other, the outer and inner conduits being in endwise register respectively, and automatically adjustable means maintaining a fluid tight joint between the outer and inner conduits, said means being mounted to move along one inner conduit and engage one end of the other inner conduit.

25. In combination, two communicating conduits, one of said conduits being rotatable with respect to the other, and automatically adjustable means maintaining a fluid tight connection between said conduits and providing for relative transverse movement thereof, said means having a limited universal connection with one conduit and being adapted to move along the same and engage one end of the other conduit.

In testimony whereof I have signed this specification.

HARVEY G. McDOWELL.